Aug. 17, 1943.   L. A. PARADISE   2,327,287
THRESHING MECHANISM
Filed March 27, 1940
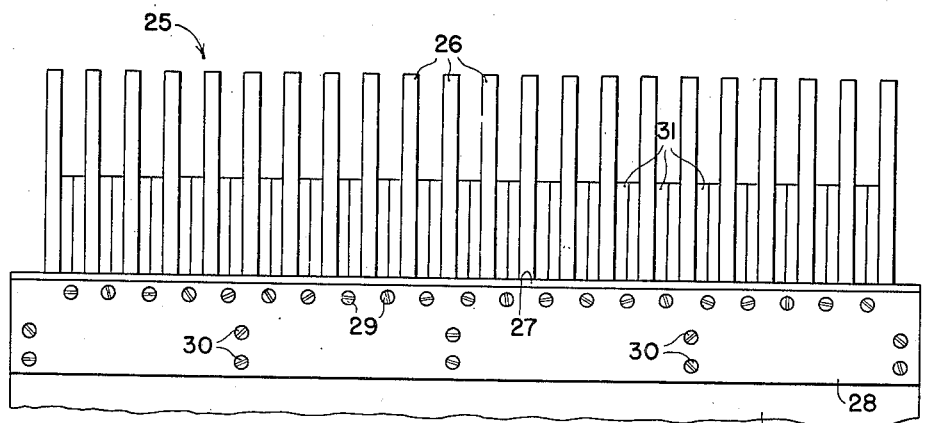
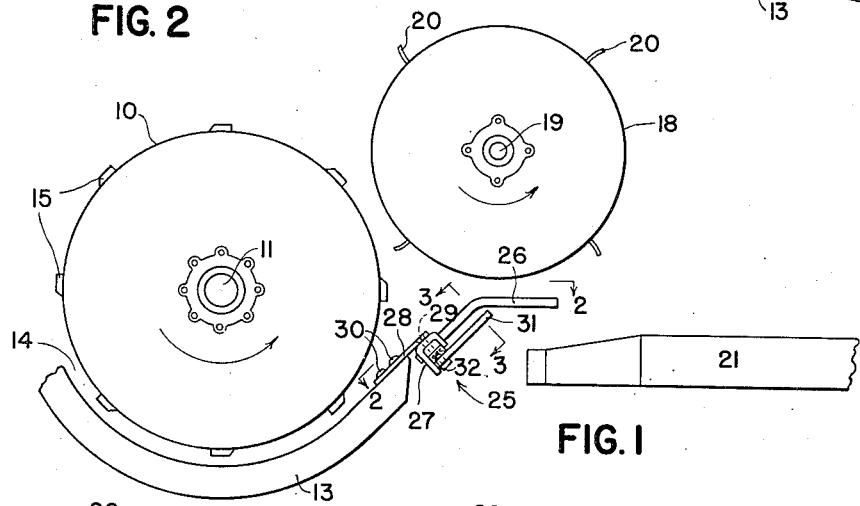
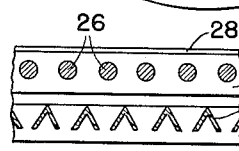 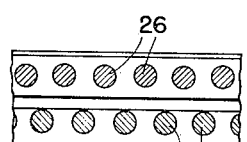 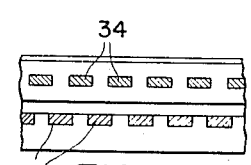
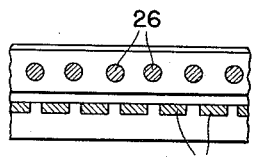 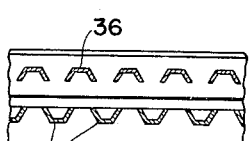 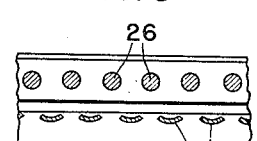
*INVENTOR:*
LOUIS A. PARADISE
BY
*ATTORNEYS.*

Patented Aug. 17, 1943

2,327,287

UNITED STATES PATENT OFFICE 2,327,287

THRESHING MECHANISM

Louis A. Paradise, Moline, Ill., assignor to Deere & Company, Moline, Ill., a corporation of Illinois Application March 27, 1940, Serial No. 326,199

1 Claim. (Cl. 130—27)

The present invention relates to threshing mechanism and has for its principal object the provision of a new and improved grate of the type which is generally disposed at the rear of the threshing concave for guiding the threshed grain and straw onto the straw rack. It is common practice in thresher design to provide a beater or stripping cylinder directly behind the threshing cylinder and having projections or teeth which move past the surface of the threshing cylinder closely adjacent thereto for stripping off any straw that tends to cling to the threshing cylinder and throw it rearwardly to the straw rack. This separating cylinder is usually made cylindrical in form with radially outwardly extending projections thereon for engaging the straw. The purpose of the cylindrical separator or beater is to deflect kernels of grain which are thrown rearwardly by the threshing cylinder and prevent their being thrown out of the rear end of the machine, and by deflecting the grain to the forward end of the straw rack, the grain is given a longer period of separation, with the result that the efficiency of the straw rack and separator is increased.

It is also common practice to provide a grate comprising a row of fingers extending rearwardly from the rear end of the concave over which the threshed grain and straw is swept by the separating cylinder and a great deal of grain is separated from the straw at this point and falls to the separating shoe below the grate. I have discovered, however, that there is an appreciable number of kernels that are thrown through the grate between the laterally spaced fingers and pass through the forward end of the thresher body, landing upon the rear end of the straw rack or even flying out of the open rear end of the body. It is, therefore, a specific object of this invention to provide additional deflecting means for deflecting those kernels of grain which are thrown through the grate between the fingers. In the accomplishment of this object I have provided a row of sub-deflecting fingers in register with the spaces between the laterally spaced grate fingers and substantially equal in width to the spaces, so that any kernels which pass between the main fingers strike the sub-deflecting fingers and are deflected downwardly to the forward part of the separating shoe.

I will now describe several embodiments of my invention, in which these and other objects and advantages will be made apparent, reference being made to the drawing appended hereto, in which Figure 1 is a partial side elevation of a threshing mechanism including a grate embodying the principles of my invention;

Figure 2 is a plan view taken along a line 2—2 in Figure 1, showing the grate and its connection to the rear end of the concave;

Figure 3 is a fragmentary sectional view taken along a line 3—3 in Figure 1, showing the shape and arrangement of the bars in the grate; and Figures 4 to 8, inclusive, are fragmentary sectional views similar to Figure 3 but showing modified forms of the fingers in the grate.

Referring now to the drawing and more particularly to Figures 1, 2 and 3, the threshing mechanism comprises a threshing cylinder 10 of more or less conventional type, rotatably mounted on a shaft 11 which is journaled in suitable bearings for rotation in a direction indicated by the arrow. A threshing concave 13 is disposed beneath the cylinder 10, embracing the lower portion thereof and spaced from the cylinder to provide a clearance 14 into which grain is fed by any suitable means to be threshed by the action of the rotating cylinder rubbing the grain against the stationary concave 13 in a manner well known to those skilled in the art. The cylinder 10 is shown as having conventional rub bars 15, but it is to be understood that my invention is not limited to any particular kind of cylinder or concave. A rotary beater or separating cylinder 18 is mounted directly behind the threshing cylinder 10 and is supported on a shaft 19 which is journaled in suitable bearings for rotation about an axis slightly higher than the axis of the cylinder 10. The separating cylinder 18 is adapted to rotate in the same direction of rotation as that of the threshing cylinder 10 so that their adjacent peripheral surfaces are moving in opposite directions. Fixed to the outer surface of the separating cylinder 18 are a plurality of axially extending rows of outwardly projecting spikes 20 which are adapted to pass closely adjacent to the surface of the threshing cylinder 10 and strip therefrom any straw which tends to cling to the rub bars 15, throwing the straw rearwardly away from the threshing cylinder toward the right, as viewed in Figure 1, where it is caught by the straw rack 21, which may be of any suitable design known to those skilled in the art. Any suitable separator shoe (not shown) may be provided beneath the straw rack 21, but inasmuch as the separator shoe forms no part of the present invention, it is omitted from the drawing for the sake of simplicity.

The threshed grain and straw are thrown rearwardly, or to the right, as viewed in Figure 1, by the action of the threshing cylinder 10, and the separating cylinder 18 is provided with an imperforate surface against which some of the kernels of grain impinge and are deflected thereby downwardly and rearwardly toward the straw rack 21.

Mounted on the rear end of the concave 13 is a finger grate, indicated in its entirety by reference numeral 25. The grate 25 comprises a a row of laterally spaced bars or fingers 26, which are cylindrical in shape and are supported at their forward ends in a transversely extending U-shaped bracket member 27. The bars 26 extend through aligned apertures in the downwardly extending flanges of the U-shaped or channel-shaped bracket 27, and are suitably secured thereto as by welding. The bracket 27 is supported on a transversely extending plate 28 by means of a row of bolts 29 which are disposed within the spaces between the bars 26. The supporting plate 28 is fixed to the rear end of the concave 13 by bolts 30. The bars 26 extend obliquely upwardly and rearwardly toward the separating cylinder 18 and the rear portions of the bars 26 are bent horizontally rearwardly under the separating cylinder.

A row of laterally spaced sub-deflecting bars 31 is supported beneath the bars 26 on the row of bolts 29 in staggered relation to the upper row of bars and extending rearwardly and generally parallel to the obliquely extending portion of the bars 26. The sub-deflecting bars are appreciably shorter than the main bars 26 and terminate approximately at the line of intersection of the plane of the sub-deflecting bars with the plane of the horizontal rear portions of the main deflecting bars 26.

Thus the lower bars 31 are disposed in register with the spaces between the upper bars and are substantially equal in width to the spaces between the upper bars so that the two rows of bars provide a barrier which prevents grain from being thrown rearwardly from the threshing cylinder 10 to any great extent. As indicated in Figure 3, the lower or rear row of bars 31 comprise V-shaped members disposed with their apices facing forwardly between the upper row of cylindrical bars 26. Thus, it is evident that any kernels of grain which pass between the cylindrical bars 26 impinge against one of the sub-deflecting bars 31 and are deflected laterally between the latter. The sub-deflecting bars are spaced rearwardly from the upper or front row of bars 26 by means of a laterally extending spacing block 32 against which the bars 31 are clamped by the bolts 29. The forward ends of the sub-deflecting bars abut against the lower flange of the channel bracket 27, which is appreciably longer than the upper flange thereof, as indicated in Figure 1.

Although the preferred shapes of the bars 26, 31 are indicated in Figure 3, undoubtedly other shapes will now be suggested to those skilled in the art, examples of which are shown in Figures 4 to 8, inclusive. In Figure 4 both the upper and lower bars 26, 33 are shown cylindrical in form. In Figure 5 both the upper and lower rows of bars are shown as rectangular in cross section, while in Figure 6 the upper row of bars 26 is shown cylindrical, as in Figure 3, while the lower row of bars 35 is shown rectangular in cross section, as in Figure 5. In Figure 7 the upper bars 36 are of V-shaped cross section but with the apex flattened off to prevent cutting the straw which is swept over them by the separating cylinder 18. The lower row of bars 37 are of similar V-shaped cross section with the apex flattened, but the bars are inverted with the apex facing rearwardly. In Figure 8 the upper bars 26 are cylindrical, as in Figure 3, while the lower bars are slightly curved in a flat V or U shape.

Thus it is evident that there are several shapes of deflecting and sub-deflecting bars which can be used in carrying out the principles of my invention, the essential feature of which is that the lower or rear row of bars is not only staggered with relation to the front row but the width of the bars in the rear row is substantially equal to the width of the spaces in the front row to prevent grain from being thrown rearwardly through the grate without being deflected by one or the other of the rows of bars.

I do not intend my invention to be limited to the exact details shown and described herein except as set forth in the following claim.

I claim:

In threshing apparatus including a cylinder and a concave cooperative therewith, a finger grate disposed behind said concave and comprising an upper row of laterally spaced fingers inclined upwardly and rearwardly, the forward end of each finger being supported on said concave, the rear ends of said fingers curving toward a horizontal position, and a lower row of laterally spaced fingers supported substantially parallel with said upper row and positioned to overlap the spaces between the fingers in said upper row.

LOUIS A. PARADISE.